(12) United States Patent
Nerone

(10) Patent No.: US 6,952,085 B2
(45) Date of Patent: Oct. 4, 2005

(54) CONTINUOUS MODE BALLAST WITH PULSED OPERATION

(75) Inventor: Louis R. Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/751,155

(22) Filed: Jan. 2, 2004

(65) Prior Publication Data

US 2005/0146287 A1 Jul. 7, 2005

(51) Int. Cl.$^7$ .............................................. H05B 37/02
(52) U.S. Cl. ............... 315/209 R; 315/224; 315/200 R; 315/291; 361/90; 361/90.1
(58) Field of Search .......................... 315/209 R, 224, 315/200 R, 219, 246, 291; 361/117, 90, 91.1, 92; 363/56.05, 40

(56) References Cited

U.S. PATENT DOCUMENTS

| | | | |
|---|---|---|---|
| 4,928,038 A | 5/1990 | Nerone | 315/209 R |
| 5,225,742 A | 7/1993 | Beasley | 315/307 |
| 5,796,216 A | 8/1998 | Beasley | 315/307 |
| 5,914,571 A | 6/1999 | Beasley | 315/244 |
| 6,160,362 A * | 12/2000 | Shone et al. | 315/308 |
| 6,417,631 B1 | 7/2002 | Chen et al. | 315/291 |
| 6,479,949 B1 | 11/2002 | Nerone et al. | 315/291 |
| 2004/0207335 A1 * | 10/2004 | Nerone et al. | 315/209 R |

OTHER PUBLICATIONS

Unitrode Products Resonant–Mode Power Supply Controllers SLUS289–Oct. 1998.

* cited by examiner

Primary Examiner—Tuyet Thi Vo
(74) Attorney, Agent, or Firm—Fay, Sharpe, Fagan, Minnich & McKee, LLP

(57) ABSTRACT

In accordance with one aspect of the present application, a continuous mode electronic ballast for operating an HID lamp includes an inverter circuit configured to generate a control signal. A resonant circuit is operationally coupled to the inverter circuit and to the lamp and configured to generate resonant voltage in response to receiving the control signal generated by the inverter circuit. A clamping circuit is operationally coupled to the resonant circuit to limit the voltage across the resonant circuit to protect components of the ballast. A multiplier circuit is operationally coupled to the resonant circuit to boost the voltage clamped by the clamping circuit to a value sufficient to permit starting of the lamp. The clamping circuit and the multiplier circuit cooperate to facilitate a continuous starting of the lamp.

16 Claims, 7 Drawing Sheets

CONTINUOUS MODE BALLAST WITH PULSED OPERATION

BACKGROUND OF THE INVENTION

The present application is directed to high frequency resonant inverter circuits that operate a lamp. More particularly, the present application is directed to the resonant inverter circuit that operates continuously from an open circuit condition at the lamp's output terminals to a short circuit condition at the lamp's output terminals and will be described with particular reference thereto.

Typically, high frequency inverters use a resonant mode to ignite the lamp. The resonant mode of operation requires the inverter to operate a resonant circuit near its resonant frequency to enable the output voltage to reach sufficient amplitude, usually 2kV-3kV, to ignite the lamp. At the fundamental switching frequency, resonant mode starting causes high currents to flow through the semiconductor devices and the ballasting components. The components of the resonant circuit have to be larger and more expensive than typically needed for steady state operation. In addition, higher currents, although achieving the required output voltage, cause the inverter to dissipate more power during initial start up than during steady state operation. To reduce power dissipation, the inverter must be turned "ON" and "OFF" to reduce power dissipation.

To correct the above problems, a resonant mode at the frequencies higher than the fundamental frequency might be employed, which requires less current to flow through the inverter components. However, since a square wave is applied to the circuit that resonates at the third harmonic or higher of the fundamental switching frequency, the desired zero switching cannot be achieved. The inverter circuit might also encounter a capacitive mode of operation that would cause damage to the intrinsic diodes of the power MOSFETs. The inverter still cannot be operated continuously without excessive power dissipation in the inverter and must be pulsed "ON" and "OFF" to reduce power dissipation.

It is desirable to operate the inverter continuously without high power dissipation. The present application contemplates a new and improved method and apparatus that overcomes the above-referenced problems and others.

BRIEF DESCRIPTION OF THE INVENTION

In accordance with one aspect of the present application, a continuous mode electronic ballast for operating an HID lamp includes an inverter circuit configured to generate a control signal. A resonant circuit is operationally coupled to the inverter circuit and to the lamp and configured to generate resonant voltage in response to receiving the control signal generated by the inverter circuit. A clamping circuit is operationally coupled to the resonant circuit to limit the voltage across the resonant circuit to protect components of the ballast. A multiplier circuit is operationally coupled to the resonant circuit to boost the voltage clamped by the clamping circuit to a value sufficient to permit starting of the lamp. The clamping circuit and the multiplier circuit cooperate to facilitate a continuous starting of the lamp.

DETAILED DESCRIPTION OF THE INVENTION

Figure 1:
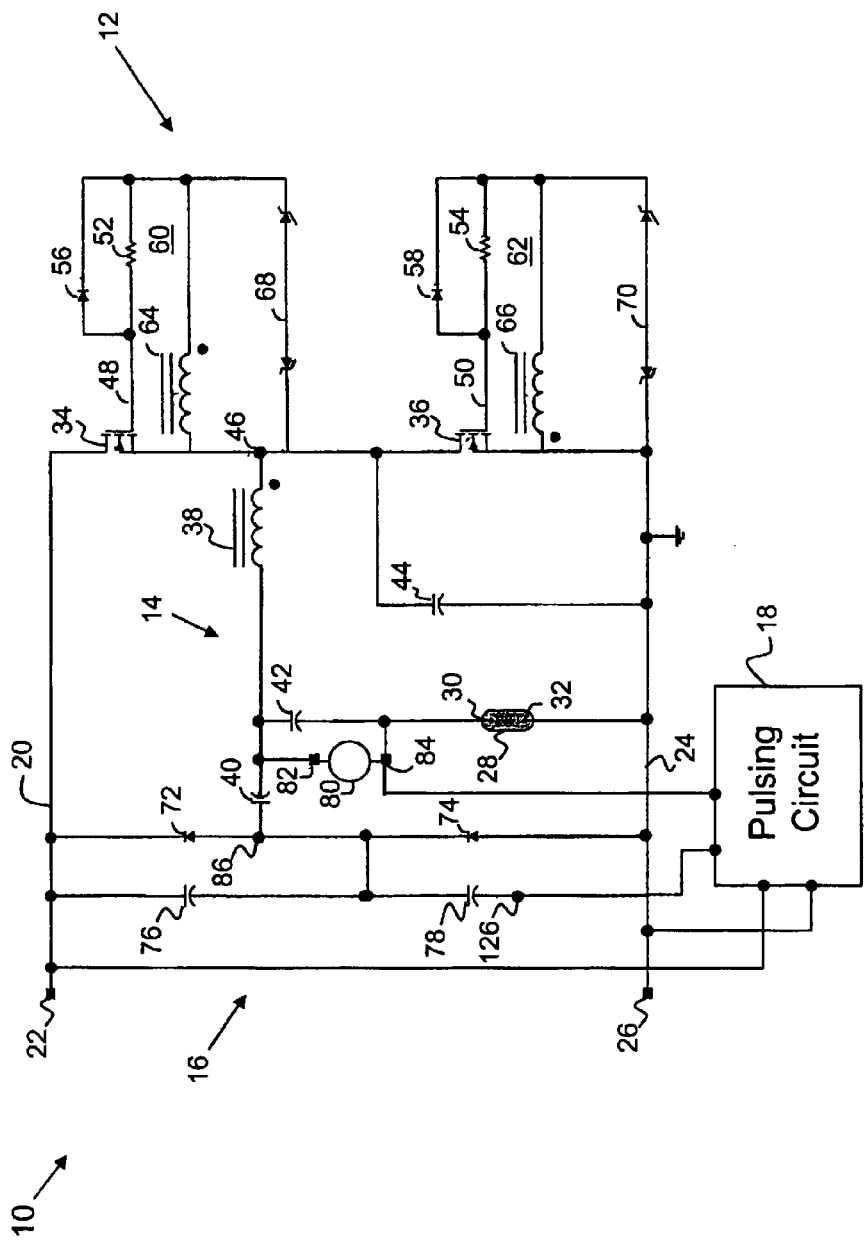
FIG. 1 illustrates a ballast circuit according to the concepts of the present application.

With reference to FIG. 1, a ballast circuit 10 includes an inverter circuit 12, a resonant circuit 14, a clamping circuit 16 and a pulsing circuit 18. A DC voltage is supplied to the inverter 12 via a voltage conductor 20 running from a positive voltage terminal 22 and a common conductor 24 connected to a ground or common terminal 26. A lamp 28 is powered via lamp connectors 30, 32.

The inverter 12 includes switches 34 and 36 such as MOSFETs, serially connected between conductors 20 and 24, to excite the resonant circuit 14. Typically, the resonant circuit 14 includes a resonant inductor 38 and a resonant capacitor 40 for setting the frequency of the resonant operation. A DC blocking capacitor 42 prevents excessive DC current flowing through lamp 28. A snubber capacitor 44 allows the inverter 12 to operate with zero voltage switching where the MOSFETs 34 and 36 turn ON and OFF when their corresponding drain-source voltages are zero.

Switches 34 and 36 cooperate to provide a square wave at a node 46 to excite the resonant circuit 14. Gate or control lines 48 and 50, running from the switches 34 and 36 respectively, each include a respective resistance 52, 54. Diodes 56, 58 are connected in parallel to the respective resistances 52, 54, making the turn-off time of the switches 34, 36 faster than the turn-on time. Achieving unequal turn-off and turn-on times provides a time when the switches 34, 36 are simultaneously in the non-conducting states to allow the voltage at the node 46 to transition from one voltage state, e.g. 450 Volts, to another voltage state, e.g. 0 Volts, by a use of residual energy stored in the inductor 38.

Figure 3:
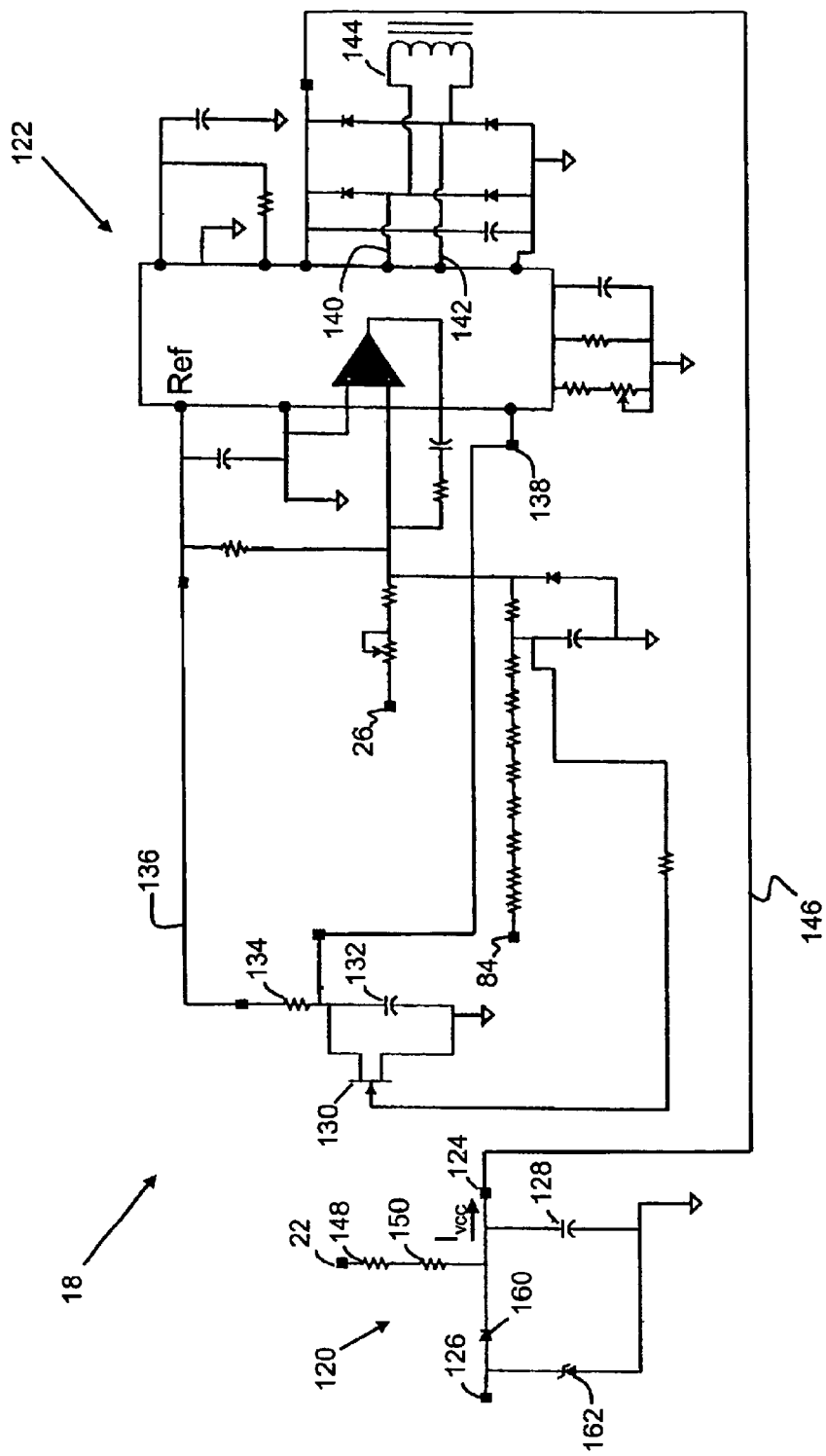
FIG. 3 depicts in more detail a pulsing circuit used in the ballast circuit.

With continuing reference to FIG. 1 and further reference to FIG. 3, gate drive circuitry, generally designated 60, 62, further includes inductors 64, 66 which are secondary windings mutually coupled to inductor 38. Gate drive circuitry 60, 62 is used to control the operation of respective switches 34 and 36. More particularly, the gate drive circuitry 60, 62 maintains switch 34 "ON" for a first half of a cycle and switch 36 "ON" for a second half of the cycle. The square wave is generated at node 46 and is used to excite resonant circuit 14. Bi-directional voltage clamps 68, 70 are connected in parallel to inductors 64, 66 respectively, each include a pair of back-to-back Zener diodes. Bi-directional voltage clamps 68, 70 act to clamp positive and negative excursions of gate-to-source voltage to respective limits determined by the voltage ratings of the back-to-back Zener diodes.

With continuing reference to FIG. 1, the output voltage of the inverter 12 is clamped by series connected diodes 72, 74 of clamping circuit 16 to limit high voltage generated to start lamp 28. The clamping circuit 16 further includes capacitors 76, 78, which are essentially connected in series to each other. Each clamping diode 72, 74 is connected across an associated capacitor 76, 78. Prior to the lamp starting, the lamp's circuit is open, since an impedance of lamp 28 is seen as very high impedance. A high voltage across capacitor 42 is generated by a multiplier 80 that ignites the lamp. The resonant circuit 14 is composed of capacitors 40, 42, 76, 78 and inductor 38 and is driven near resonance. As the output voltage at node 84 increases, the diodes 72, 74 start to clamp, preventing the voltage across capacitors 76, 78 from changing sign and limiting the output voltage to the value that does not cause overheating of the inverter 12 components. When the diodes 72, 74 are clamping capacitors 76 and 78, the resonant circuit becomes composed of the capacitor 40 and inductor 38. Therefore, the resonance is achieved when the diodes 72, 74 are not conducting.

Figure 2:
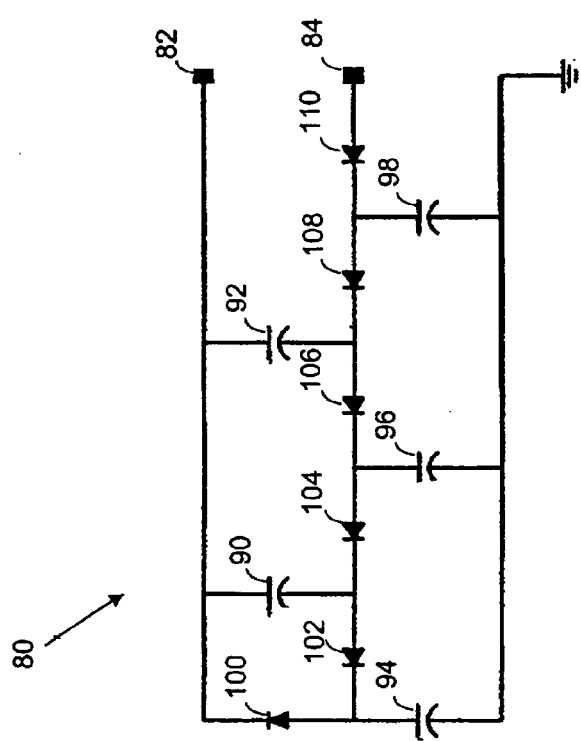
FIG. 2 depicts in more detail a multiplier used in the ballast circuit.

With continuing reference to FIG. 1 and further reference to FIG. 2, multiplier circuit 80 boosts the voltage limited by the clamping circuit 16. The multiplier 80 is connected across capacitor 42 to terminals 82, 84 to achieve a starting voltage by multiplying inverter 12 output voltage at node 84. At the beginning of the operation, inverter 12 supplies voltage to the terminals 82, 84. Capacitors 90, 92, 94, 96, 98 cooperate with diodes 100, 102, 104, 106, 108, 110 to accumulate charge one half of a cycle, while during the other half of the cycle the negative charge is dumped into capacitor 42 through terminal 86. Typically, when inverter 12 voltage is 500V peak to peak, the voltage across terminals 84, 86 rises to about −2 kVDC.

The multiplier 80 is a low DC bias charge pump multiplier. During steady-state operation the multiplier 80 applies only a small dc bias (about 0.25 Volts) to the lamp which does not affect the lamp's operation or life.

With continuing reference to FIG. 1, pulsing circuit 18 is used to turn inverter 12 "ON" and "OFF." Typically, when lamp 28 is in an open circuit, the power dissipation of inverter 12 is about 12 to 15 W. Normally this would not cause a problem, except the cabling has to withstand a voltage of about 1.6 kVDC, setting a limitation on the use of standard cables which are typically rated at 600V RMS. The pulsing circuit 18 turns inverter 12 "ON" supplying a constant high voltage to lamp 28 for about 40–50 msec and "OFF" for the rest of the cycle. The resultant RMS is only 600V, permitting a use of conventional 600V wiring cables. In addition, such duty cycle reduces the power dissipation in the open circuit to about 2/3 W, because the inverter circuit is shut down for about 90% of the cycle.

With continuing reference to FIG. 1 and further reference to FIG. 3, a charge pump circuit 120 operates a control circuit 122 of pulsing circuit 18. In one embodiment, the control circuit 122 is a UC3861 circuit manufactured by Texas Instruments, although it is to be understood that any other appropriate control circuit may also be used. The control circuit 122 is connected to terminals 26 and 86, and to a terminal 124 of charge pump circuit 120. The charge pump circuit 120 derives power from clamping circuit 16 through a terminal 126. Initially, when lamp 28 is not lit, inverter 12 drives multiplier circuit 16 to a negative voltage, in this embodiment to nearly −2 kV, charging an electrolytic capacitor 128 of pump charge circuit 120. A depletion mode switch 130 is in the conducting mode. As the negative voltage rises, voltage at a gate of switch 130 decreases negatively until switch 130 shuts off, allowing a capacitor 132 to charge through a series connected resistance 134. The resistance 134 is connected to a 5V reference voltage of control circuit 122 through a line 136. When capacitor 132 charges to about 2V, it enables a fault pin 138 of control circuit 122 shutting down control circuit 122 and inverter 12. More specifically, output drivers of control circuit 122 connected to lines 140, 142 become disabled, turning off the primary winding 68 that supplies voltage to mutually coupled inductors 64, 66 of inverter 12. The electrolytic capacitor 128 ceases to charge through the inverter 12. The negative voltage gradually decreases reaching the value of the Under Voltage Lockout (UVLO) of control circuit 122. At this time, control circuit 122 is reset and enters into a low quiescent current state. The low quiescent current of 15 μA allows the electrolytic capacitor 128 to charge through a line 144 connected to terminal 124. The capacitor 128 charges through series connected resistances 146, 148. When the voltage rises to about 16.5V, e.g. UVLO threshold voltage of the UC386881, the control circuit 122 enables the output drivers which turn "ON" inverter 12. The inverter 12 starts driving multiplier 82, negatively charging capacitor 128. The process repeats until lamp 28 ignites.

Figure 4A:
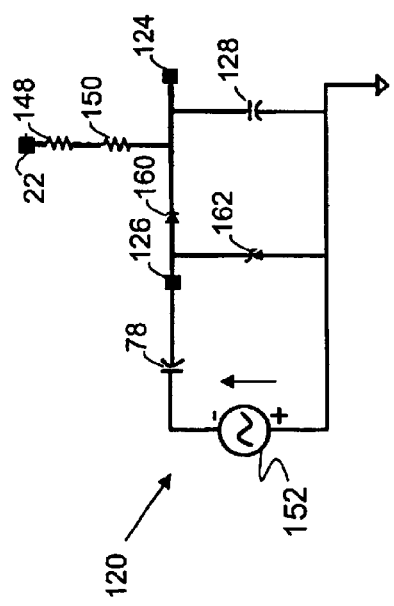
FIGS. 4A–B depict a charge pump circuit that controls a power controller of the pulsing circuit.
Figure 4B:
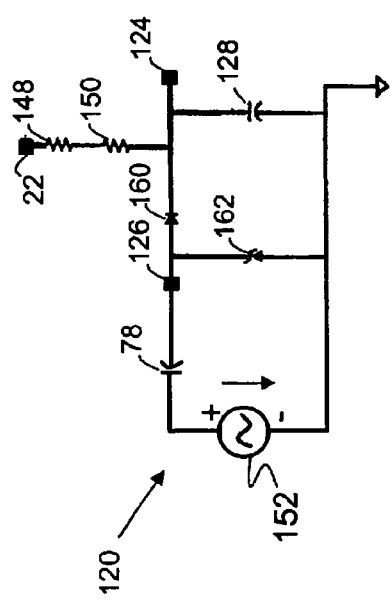

With continuing reference to FIGS. 1 and 3 and further reference to FIGS. 4A–B, charge pump circuit 120 derives power from a component of inverter 12 resonant capacitance. FIGS. 4A–B illustrate an operational flow occurring in charge pump circuit 120 when it is powered by a power source 152. More particularly, when inverter 12 is in the "ON" state, capacitor 80 is periodically charged and discharged through capacitor 128. With continuing reference to FIG. 4A, during the first half of the cycle, capacitor 80 accumulates the charge as the current through capacitor 80 flows counterclockwise. With continuing reference to FIG. 4B, during the second half of the cycle, the accumulated charge is dumped into capacitor 128. More specifically, during the second half of the cycle, the current changes direction to clockwise. A diode 160, connected in series with capacitor 80 and capacitor 128, is conducting, allowing capacitor 128 to charge through capacitor 80. The voltage is regulated by a Zener diode 162 which is connected across capacitor 128. Typically, the voltage is limited to 14V.

Figure 5:
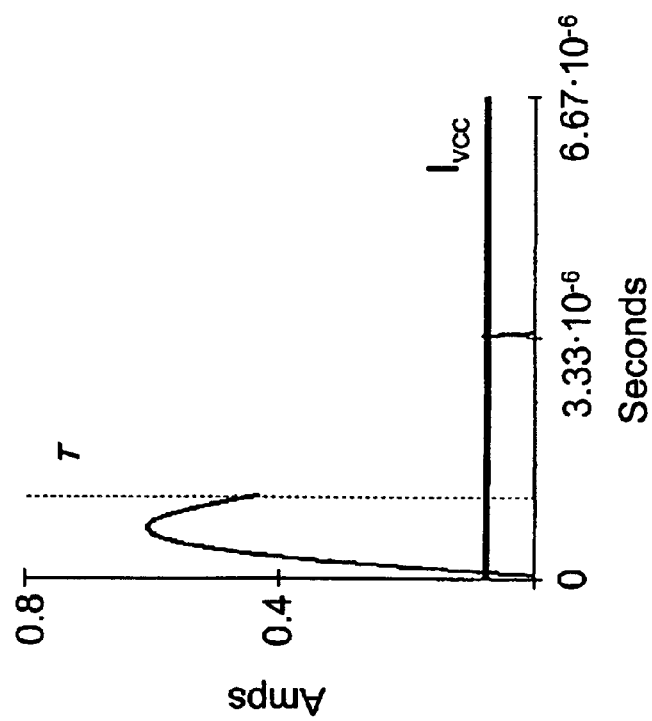
FIG. 5 shows a graph of the charge pump current vise time during the open circuit condition.
Figure 6:
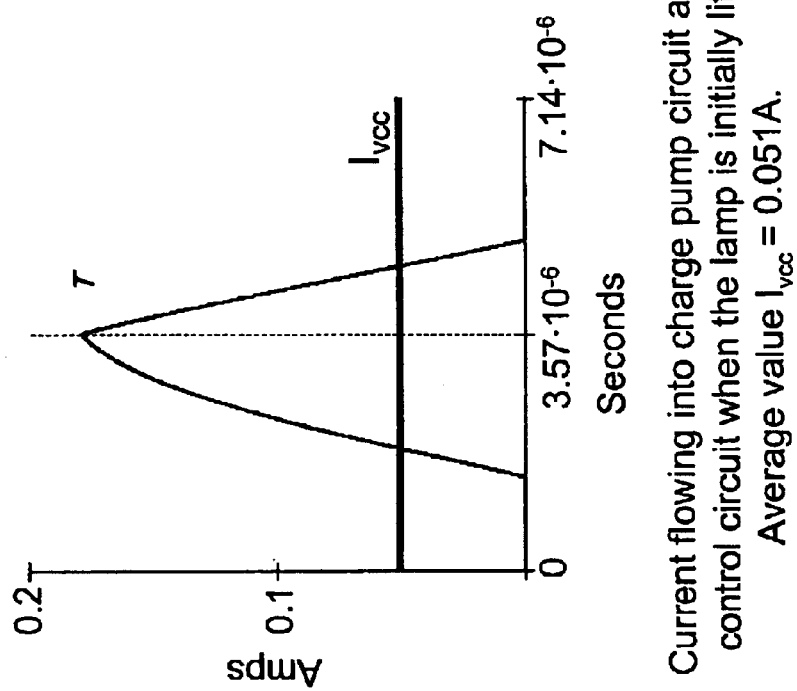
FIG. 6 shows a graph of the charge pump current vise time during the time when the lamp is initially lit.
Figure 7:
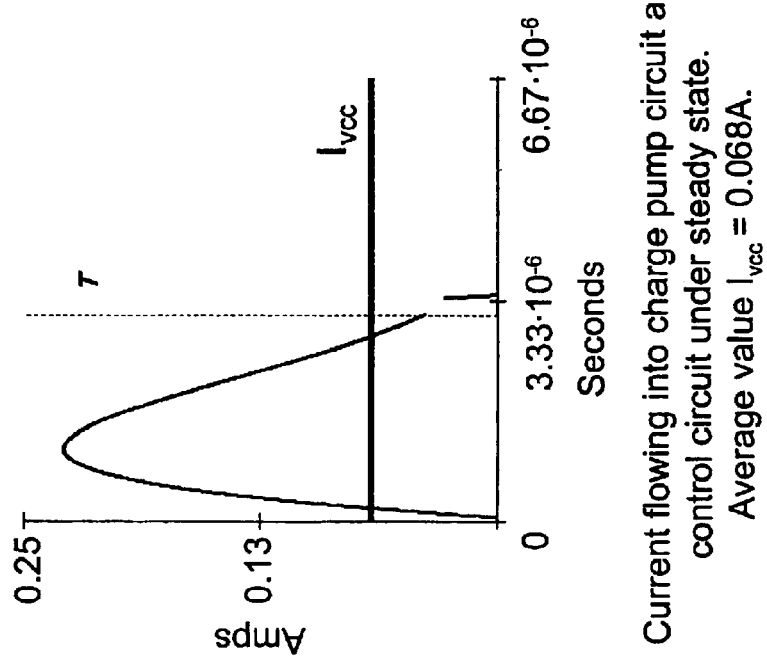
FIG. 7 shows a graph of the charge pump current vise time during the steady state operation.

With reference to FIGS. 5–7, charge pump circuit 120 is shown to be independent of the lamp's state. When lamp 28 is in an open circuit, its resistance is about 1MΩ, and the current flowing into charge pump 120 is about 77 mA as illustrated in FIG. 5. When lamp 28 first lights, its resistance is about 5 Ω, and the current flowing into charge pump circuit 120 is about 51 mA as illustrated in FIG. 6. When lamp 28 is in a steady state, its resistance is about 51 Ω, and the current flowing into charge pump circuit 120 is about 68 mA as illustrated in FIG. 7. As shown in FIGS. 5–7, the current flowing into charge pump circuit 120 and control circuit 122 does not substantially change when the lamp changes its state from the open circuit to steady state. This design acts to prevent high heat dissipation on Zener diode 162.

While it is to be understood the described circuit may be implemented using a variety of components with different components values, provided below is a listing for one particular embodiment when the components have the following values:

| Component Name/Number | Component Values |
| --- | --- |
| Switch 34 | 20NMD50 |
| Switch 36 | 20NMD50 |
| Inductor 38 | 90 μH |
| Capacitor 40 | 22 nF, 630 V |
| Capacitor 42 | 33 nF, 2 kV |

-continued

| Component Name/Number | Component Values |
|---|---|
| Capacitor 44 | 680 pF, 500 V |
| Resistor 52 | 100 Ω |
| Resistor 54 | 100 Ω |
| Diode 56 | 1N4148 |
| Diode 58 | 1N4148 |
| Inductor 64 | 1 mH |
| Inductor 66 | 1 mH |
| Diode Clamp 70 | 1N4739, 9.1 V |
| Diode Clamp 72 | 1N4739, 9.1 V |
| Diode 74 | 8ETH06S |
| Diode 76 | 8ETH06S |
| Capacitor 78 | 1 nF, 500 V |
| Capacitor 80 | 1 nF, 500 V |
| Capacitors 90, 92, 94, 98, 100 | 150 pF, 2 kV |
| Diodes 100, 102, 104, 106, 108, 110 | 1 kV |
| Capacitor 128 | 100 µF, 25 V |
| Switch 130 | 2N4391 |
| Capacitor 132 | 47 nF |
| Resistor 134 | 1 MΩ |
| Resistors 146, 148 | 220 kΩ |
| Diode 160 | 1N4148 |
| Zener Diode 162 | 14 V |

The exemplary embodiment has been described with reference to the illustrated embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A continuous mode electronic ballast for operating an HID lamp comprising:
   an inverter circuit configured to generate a control signal;
   a resonant circuit, configured for operational coupling to the inverter circuit and to the lamp to generate resonant voltage in response to receiving the control signal;
   a clamping circuit, operationally coupled to the resonant circuit to limit the voltage across the resonant circuit to protect components of the ballast; and
   a multiplier circuit, operationally coupled to the resonant circuit to boost the voltage clamped by the clamping circuit to a value sufficient to permit starting of the lamp, wherein
   the clamping circuit and the multiplier circuit cooperate to facilitate a continuous starting of the lamp.

2. The ballast according to claim 1, wherein the multiplier precludes forward biasing of diodes to accomplish a lower power dissipation.

3. The ballast according to claim 1, wherein the multiplier precludes forward biasing of diodes realizing a DC bias of +/−0.25V or less.

4. The ballast according to claim 1, wherein the resonant circuit includes a resonant capacitor, operationally connected to a node, and the clamping circuit includes:
   a pair of serially operationally connected diodes connected to a voltage bus and a common bus;
   a first capacitor, operationally connected between the voltage bus and the common node; and
   a second capacitor), operationally connected between the node and the common bus and in parallel to the first capacitor, the first and the second capacitors are in series with the resonant capacitor, wherein each diode is operationally connected across an associated capacitor to maintain an output voltage at an output terminal as determined by switching frequency and values of capacitors.

5. The ballast according to claim 1, further including:
   a blocking capacitor, operationally connected in series with the lamp and between a terminal and a terminal.

6. The ballast according to claim 5, wherein the multiplier is operationally connected to the terminals to multiply an output voltage of the inverter at the terminal and store negative charge into the blocking capacitor through the terminal.

7. The ballast according to claim 1, further including:
   a pulsing circuit to turn the inverter "ON" and "OFF," the pulsing circuit including:
   a control circuit which controls a supply of power to the inverter; and
   a charge pump circuit which controls an operation of the control circuit.

8. The ballast according to claim 7, wherein the pulsing circuit facilitates a reduced power dissipation prior to lighting of the lamp, which power dissipation is 2/3 W or less.

9. The ballast according to claim 7, wherein the charge pump circuit and the control circuit cooperate to generate a duty cycle, at which the inverter is turned "ON" for a predetermined time to generate a voltage sufficient to start the lamp and "OFF" to reduce an RMS of the inverter to 600V or less.

10. The ballast according to claim 9, wherein the reduced RMS is generated by turning the inverter "ON" for 50 msec or less and "OFF" for the rest of a cycle.

11. The ballast according to claim 9, wherein the reduced RMS of the inverter facilitates a use of conventional power cables rated at 600V.

12. A continuous mode electronic ballast for operating an HID lamp comprising:
   a resonant circuit incorporating lamp connections and including a resonant inductance and a resonant capacitance;
   an inverter circuit, operationally coupled to the resonant circuit for inducing an AC current in the resonant circuit, the inverter circuit including:
     first and second switches serially connected between a bus conductor at a DC voltage and a reference conductor, and being connected together at a common node, through which the AC load current flows, and
     a gate drive circuitry for controlling the corresponding first and second switches;.
   a clamping circuit, operationally coupled to the resonant circuit and configured to limit a voltage generated by the resonant circuit to a value which is substantially safe for components of the ballast;
   a multiplier circuit, operationally connected across terminals to boost an output voltage of the inverter to a value sufficient to ignite the lamp; and
   a pulsing circuit which includes;
     a pump charge circuit, and
     a control circuit, the pump charge circuit and the control circuit cooperate to supply power to the inverter for a predetermined time each cycle.

13. The ballast according to claim 12, wherein the clamping circuit includes a pair of serially connected diodes, each diode connected across an associated capacitor.

14. The ballast according to claim 12, wherein the multiplier circuit includes:

capacitors, and
diodes, wherein
the capacitors and diodes cooperate to preclude forward biasing of diodes to lower a power dissipation of the ballast.

15. The ballast according to claim 14, wherein the resonant circuit further includes a blocking capacitor, connected to the terminals and the multiplier cooperates with the inverter to accumulate charge in the capacitors for a first half of a cycle and dump the accumulated charge into the blocking capacitor for a second half of the cycle.

16. The ballast according to claim 12, wherein the pulsing circuit facilitates the continuous operation of the ballast by achieving a zero switching frequency of the inverter.

* * * * *